United States Patent
Yuan (10) Patent No.: US 12,035,258 B2
(45) Date of Patent: Jul. 9, 2024

(54) SYNCHRONIZATION SIGNAL SENDING METHOD AND COMMUNICATIONS DEVICE

(71) Applicant: HUAWEI TECHNOLOGIES CO., LTD., Guangdong (CN)

(72) Inventor: Pu Yuan, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 543 days.

(21) Appl. No.: 17/230,632

(22) Filed: Apr. 14, 2021

(65) Prior Publication Data
US 2021/0235401 A1 Jul. 29, 2021

Related U.S. Application Data (63) Continuation of application No. PCT/CN2019/107147, filed on Sep. 21, 2019.

(30) Foreign Application Priority Data

Oct. 15, 2018 (CN) .......................... 201811198590.8

(51) Int. Cl.
H04W 56/00 (2009.01)
H04W 72/0446 (2023.01)
H04W 4/40 (2018.01)

(52) U.S. Cl.
CPC ..... H04W 56/001 (2013.01); H04W 72/0446 (2013.01); *H04W 4/40* (2018.02)

(58) Field of Classification Search
CPC . H04W 56/001; H04W 72/0446; H04W 4/40; H04W 4/46; H04W 56/0015; H04W 84/18; H04L 5/0048
See application file for complete search history.

(56) References Cited

U.S. PATENT DOCUMENTS

2018/0084593 A1 3/2018 Chen et al.
2018/0206208 A1 7/2018 Nguyen et al.
(Continued)

FOREIGN PATENT DOCUMENTS

CN 105934900 A 9/2016
CN 107278383 A 10/2017
(Continued)

OTHER PUBLICATIONS

Intel Corporation: "Sidelink Synchronization for NR V2X Communication", 3GPP Draft; R1-1810774,Sep. 29, 2018, pp. 1-12.
(Continued)

*Primary Examiner* — Vinncelas Louis
(74) *Attorney, Agent, or Firm* — WOMBLE BOND DICKINSON (US) LLP (57) ABSTRACT

This application provides a synchronization signal sending method and a communications device, and provides a synchronization signal receiving method in V2X sidelink transmission communication. A complementary sidelink synchronization signal is sent in a time interval for sending synchronization signal burst sets, and is generated by using a sidelink synchronization identification of a first communications device. The complementary sidelink synchronization signal may be flexibly configured in a data frame following a synchronization signal frame, and may be sent together with sidelink control information or sidelink data. In addition, sending or skipping sending the complementary sidelink synchronization signal is optional. As a supplement to a sidelink synchronization signal, the complementary sidelink synchronization signal occupies a few resources and is sent at high frequency. Therefore, synchronization reliability can be improved when a vehicle moves fast.

16 Claims, 7 Drawing Sheets

(56) References Cited

U.S. PATENT DOCUMENTS

| | | | |
|---|---|---|---|
| 2020/0045664 A1* | 2/2020 | Choi | H04W 72/046 |
| 2020/0112978 A1* | 4/2020 | Zhang | H04W 16/14 |
| 2021/0168574 A1* | 6/2021 | Zhang | H04W 8/005 |

FOREIGN PATENT DOCUMENTS

| | | | |
|---|---|---|---|
| CN | 107548146 A | | 1/2018 |
| CN | 107820273 A | | 3/2018 |
| EP | 3605957 A1 | | 2/2020 |
| WO | 2018093220 A1 | | 5/2018 |
| WO | 2018176222 A1 | | 10/2018 |
| WO | WO-2019143937 A1 | * | 7/2019 |

OTHER PUBLICATIONS

ITL, Discussion on NR V2X Synchronization mechanism. 3GPP TSG-RAN WG1 Meeting #94bis, Chengdu, China, Oct. 8 12, 2018, R1-1811425, 4 pages.

* cited by examiner

SYNCHRONIZATION SIGNAL SENDING METHOD AND COMMUNICATIONS DEVICE

CROSS-REFERENCE TO RELATED APPLICATIONS

This application is a continuation of International Application No. PCT/CN2019/107147, filed on Sep. 21, 2019. Which claims priority to Chinese Patent Application No. 201811198590.8, filed on Oct. 15, 2018. The disclosures of the aforementioned applications are hereby incorporated by reference in their entireties.

TECHNICAL FIELD

Embodiments of this application relate to a communications system, and in particular, to a synchronization signal sending method and a communications device.

BACKGROUND

Device-to-device (D2D) communication, vehicle-to-vehicle (V2V) communication, vehicle-to-pedestrian V2P (V2P) communication, or vehicle-to-infrastructure/network V2I/N (V2I/N) communication is a technology for direct communication between terminal device(s). Direct transmission between terminal devices is defined as sidelink (SL) transmission. V2V, V2P, and V2I/N are collectively referred to as V2X, that is, a vehicle communicates with anything.

Using V2X communication as an example, a terminal device needs to synchronize with another terminal device. In existing V2X communication, synchronization signals include a primary synchronization signal and a secondary synchronization signal, and are transmitted by an antenna by using a spherical beam. A receive-end terminal device performs detection on the primary synchronization signal to obtain timing information, and then performs detection on the secondary synchronization signal based on the timing information to obtain a physical-layer sidelink synchronization identification, to implement synchronization between different terminal devices in the V2X communication. However, when the synchronization signals are sent through beam sweeping, the primary synchronization signal and the secondary synchronization signal are separate, that is, are comparatively far apart in time domain. For example, the primary synchronization signal and the secondary synchronization signal are sent at the beginning and the end of one subframe respectively. As a result, a process of sending the synchronization signals through beam sweeping is comparatively long, time costs of synchronization are comparatively high, and out-of-synchronization occurs when the terminal device moves fast, resulting in comparatively low reliability. In addition, in a fifth-generation (5G) mobile communications system, a base station sends a synchronization signal burst set through beam sweeping by using an antenna array including a plurality of antennas, to synchronize with a terminal device. However, if a transmission interval of synchronization signal burst sets is fixed, when a vehicle moves fast, a Doppler frequency shift and a propagation delay increase, thereby causing out-of-synchronization and reducing synchronization reliability.

SUMMARY

Embodiments of this application provide a synchronization signal sending method and a communications device, to improve synchronization reliability in V2X communication.

According to a first aspect, a synchronization signal sending method is provided. The method may be performed by a first communications device or a chip of a first communications device, and includes: the first communications device sends a first synchronization signal burst set to a second communications device in at least one time unit in a first time unit set, where the first synchronization signal burst set includes L synchronization signal blocks, the first time unit set includes p time units, and p is a positive integer. The first communications device sends a second synchronization signal burst set to the second communications device in at least one time unit in a second time unit set, where the second synchronization signal burst set includes I synchronization signal blocks, the second time unit set includes q time units, q is a positive integer, the synchronization signal block includes at least one of a primary synchronization signal, a secondary synchronization signal, or a physical broadcast channel, an interval between the last time unit in the first time unit set and the $1^{st}$ time unit in the second time unit set is m time units, L and I are integers greater than or equal to 1, and m is an integer greater than or equal to 1. The first communications device sends a complementary sidelink synchronization signal to the second communications device in n time units of the m time units, where n is a positive integer less than or equal to m, and the complementary sidelink synchronization signal is to be used by the second communications device to synchronize with the first communications device.

According to this application, the first communications device sends the complementary sidelink synchronization signal in a time interval for sending the first synchronization signal burst set and the second synchronization signal burst set. The complementary sidelink synchronization signal can meet a requirement of frequent synchronization information updates, occupies a few resources, and improves synchronization reliability in V2X communication.

In one embodiment, a physical broadcast channel included in the L synchronization signal blocks includes first indication information, and the first indication information indicates a time unit in which the first communications device sends or skips sending a complementary sidelink synchronization signal in the m time units. In this way, a transmission interval or transmission locations of complementary sidelink synchronization signals may be indicated by the first indication information, so that transmission of complementary synchronization signals can be configured more flexibly.

In one embodiment, the first communications device sends a complementary sidelink synchronization signal to the second communications device on a first resource in a third time unit. The first resource belongs to a second resource in the third time unit, or the first resource belongs to a third resource in the third time unit. The third time unit belongs to the n time units. The second resource in the third time unit may be used by the first communications device to send sidelink control information to the second communications device. The third resource in the third time unit may be used by the first communications device to send sidelink data to the second communications device. In this way, a resource occupied by the complementary sidelink synchronization signal may be a resource for sending the sidelink control information or a resource for sending the sidelink data, thereby improving resource utilization.

In one embodiment, the first communications device sends a complementary sidelink synchronization signal to the second communications device on the $1^{st}$ symbol in a third time unit. The third time unit belongs to the n time units.

In one embodiment, the complementary sidelink synchronization signal is further used for automatic gain control. In this way, the complementary sidelink synchronization signal can be used for both synchronization and automatic gain control, thereby improving resource utilization.

In one embodiment, that the first communications device sends a first synchronization signal burst set to a second communications device in at least one time unit in a first time unit set includes: The first communications device sends the first synchronization signal burst set to the second communications device in at least one time unit in the first time unit set through beam sweeping. That the first communications device sends a second synchronization signal burst set to the second communications device in at least one time unit in a second time unit set includes: The first communications device sends the second synchronization signal burst set to the second communications device in at least one time unit in the second time unit set through beam sweeping. In this way, the first communications device may send the first synchronization signal burst set and the second synchronization signal burst set through beam sweeping.

In one embodiment, the first communications device receives second indication information from the second communications device. The second indication information indicates a beam selected by the second communications device. In this way, the first communications device receives beam selection information fed back by the second communications device.

In one embodiment, that the first communications device sends a complementary sidelink synchronization signal to the second communications device in n time units of the m time units includes: The first communications device sends the complementary sidelink synchronization signal to the second communications device in the n time units of the m time units through beam sweeping, omnidirectional transmission, or transmission with a specific beam.

According to a second aspect, a synchronization signal sending method is provided. The method may be performed by a second communications device or a chip of a second communications device, and includes: The second communications device receives a first synchronization signal burst set from a first communications device in at least one time unit in a first time unit set, where the first synchronization signal burst set includes L synchronization signal blocks, the first time unit set includes p time units, and p is a positive integer. The second communications device receives a second synchronization signal burst set from the first communications device in at least one time unit in a second time unit set, where the second synchronization signal burst set includes l synchronization signal blocks, the second time unit set includes q time units, q is a positive integer, the synchronization signal block includes at least one of a primary synchronization signal, a secondary synchronization signal, or a physical broadcast channel, an interval between the last time unit in the first time unit set and the $1^{st}$ time unit in the second time unit set is m time units, L and l are integers greater than or equal to 1, and m is an integer greater than or equal to 1. The second communications device receives a complementary sidelink synchronization signal from the first communications device in n time units of the m time units, where n is a positive integer less than or equal to m, and the complementary sidelink synchronization signal is to be used by the second communications device to synchronize with the first communications device.

According to this application, the first communications device sends the complementary sidelink synchronization signal in a time interval for sending the first synchronization signal burst set and the second synchronization signal burst set. The complementary sidelink synchronization signal can meet a requirement of frequent synchronization information updates, occupies a few resources, and improves synchronization reliability in V2X communication.

In one embodiment, a physical broadcast channel included in the L synchronization signal blocks includes first indication information, or the second communications device receives first indication information from a network device, a physical broadcast channel included in the L synchronization signal blocks includes first indication information, and the first indication information indicates a time unit in which the first communications device sends or skips sending a complementary sidelink synchronization signal in the m time units. In this way, a transmission interval of complementary sidelink synchronization signals may be indicated by the first indication information or indicated by the network device, so that transmission of complementary synchronization signals can be configured more flexibly.

In one embodiment, the second communications device receives a complementary sidelink synchronization signal from the first communications device on a first resource in a third time unit. The first resource belongs to a second resource in the third time unit, or the first resource belongs to a third resource in the third time unit. The third time unit belongs to the n time units. The second resource in the third time unit may be used by the second communications device to receive sidelink control information from the first communications device. The third resource in the third time unit may be used by the second communications device to receive sidelink data from the first communications device. In this way, a resource occupied by the complementary sidelink synchronization signal may be a resource for sending the sidelink control information or a resource for sending the sidelink data, thereby improving resource utilization.

In one embodiment, the second communications device receives a complementary sidelink synchronization signal from the first communications device on the $1^{st}$ symbol in a third time unit. The third time unit belongs to the n time units.

In one embodiment, the complementary sidelink synchronization signal is further used for automatic gain control. In this way, the complementary sidelink synchronization signal can be used for both synchronization and automatic gain control, thereby improving resource utilization.

In one embodiment, that the second communications device receives a first synchronization signal burst set from a first communications device in at least one time unit in a first time unit set includes: The second communications device receives, from the first communications device in at least one time unit in the first time unit set, the first synchronization signal burst set sent by the first communications device through beam sweeping. That the second communications device receives a second synchronization signal burst set from the first communications device in at least one time unit in a second time unit set includes: The second communications device receives, from the first communications device in at least one time unit in the second time unit set, the second synchronization signal burst set sent by the first communications device through beam sweeping. In this way, the first communications device may send the first synchronization signal burst set and the second synchronization signal burst set through beam sweeping.

In one embodiment, the second communications device sends second indication information to the first communications device. The second indication information indicates a beam selected by the second communications device. In this way, the second communications device sends feedback beam selection information to the first communications device.

In one embodiment, that the second communications device receives a complementary sidelink synchronization signal from the first communications device in n time units of the m time units includes: The second communications device receives, from the first communications device in the n time units of the m time units, the complementary sidelink synchronization signal sent by the first communications device through beam sweeping, omnidirectional transmission, or transmission with a specific beam.

According to a third aspect, a first communications device is provided, including: a sending unit, configured to send a first synchronization signal burst set to a second communications device in at least one time unit in a first time unit set, where the first synchronization signal burst set includes L synchronization signal blocks, the first time unit set includes p time units, and p is a positive integer.

The sending unit is further configured to send a second synchronization signal burst set to the second communications device in at least one time unit in a second time unit set. The second synchronization signal burst set includes I synchronization signal blocks. The second time unit set includes q time units, and q is a positive integer. The synchronization signal block includes at least one of the following information: a primary synchronization signal, a secondary synchronization signal, or a physical broadcast channel. An interval between the last time unit in the first time unit set and the $1^{st}$ time unit in the second time unit set is m time units. L and I are integers greater than or equal to 1, and m is an integer greater than or equal to 1.

The sending unit is further configured to send a complementary sidelink synchronization signal to the second communications device in n time units of the m time units. n is a positive integer less than or equal to m. The complementary sidelink synchronization signal is to be used by the second communications device to synchronize with the first communications device.

According to this application, the first communications device sends the complementary sidelink synchronization signal in a time interval for sending the first synchronization signal burst set and the second synchronization signal burst set. The complementary sidelink synchronization signal can meet a requirement of frequent synchronization information updates, occupies a few resources, and improves synchronization reliability in V2X communication.

In one embodiment, a physical broadcast channel included in the L synchronization signal blocks includes first indication information, and the first indication information indicates a time unit in which the first communications device sends or skips sending a complementary sidelink synchronization signal in the m time units. In this way, a transmission interval of complementary sidelink synchronization signals may be indicated by the first indication information, so that transmission of complementary synchronization signals can be configured more flexibly.

In one embodiment, the sending unit is further configured to send a complementary sidelink synchronization signal to the second communications device on a first resource in a third time unit. The first resource belongs to a second resource in the third time unit, or the first resource belongs to a third resource in the third time unit. The third time unit belongs to the n time units. The second resource in the third time unit may be used by the sending unit to send sidelink control information to the second communications device. The third resource in the third time unit may be used by the sending unit to send sidelink data to the second communications device. In this way, a resource occupied by the complementary sidelink synchronization signal may be a resource for sending the sidelink control information or a resource for sending the sidelink data, thereby improving resource utilization.

In one embodiment, the sending unit is further configured to send a complementary sidelink synchronization signal to the second communications device on the $1^{st}$ symbol in a third time unit. The third time unit belongs to the n time units.

In one embodiment, the complementary sidelink synchronization signal is further used for automatic gain control. In this way, the complementary sidelink synchronization signal can be used for both synchronization and automatic gain control, thereby improving resource utilization.

In one embodiment, that the sending unit is configured to send a first synchronization signal burst set to a second communications device in at least one time unit in a first time unit set includes: The sending unit is configured to send the first synchronization signal burst set to the second communications device in at least one time unit in the first time unit set through beam sweeping. That the sending unit is configured to send a second synchronization signal burst set to the second communications device in at least one time unit in a second time unit set includes: The sending unit is configured to send the second synchronization signal burst set to the second communications device in at least one time unit in the second time unit set through beam sweeping. In this way, the first communications device may send the first synchronization signal burst set and the second synchronization signal burst set through beam sweeping.

In one embodiment, the first communications device further includes a receiving unit, configured to receive second indication information from the second communications device. The second indication information indicates a beam selected by the second communications device. In this way, the first communications device receives beam selection information fed back by the second communications device.

In one embodiment, that the sending unit is configured to send a complementary sidelink synchronization signal to the second communications device in n time units of the m time units includes: The sending unit is configured to send the complementary sidelink synchronization signal to the second communications device in the n time units of the m time units through beam sweeping, omnidirectional transmission, or transmission with a specific beam.

According to a fourth aspect, a second communications device is provided, including: a receiving unit, configured to receive a first synchronization signal burst set from a first communications device in at least one time unit in a first time unit set, where the first synchronization signal burst set includes L synchronization signal blocks, the first time unit set includes p time units, and p is a positive integer.

The receiving unit is further configured to receive a second synchronization signal burst set from the first communications device in at least one time unit in a second time unit set. The second synchronization signal burst set includes I synchronization signal blocks. The second time unit set includes q time units, and q is a positive integer. The synchronization signal block includes at least one of the following information: a primary synchronization signal, a secondary synchronization signal, or a physical broadcast channel. An interval between the last time unit in the first time unit set and the $1^{st}$ time unit in the second time unit set is m time units. L and l are integers greater than or equal to 1, and m is an integer greater than or equal to 1.

The receiving unit is further configured to receive a complementary sidelink synchronization signal from the first communications device in n time units of the m time units. n is a positive integer less than or equal to m. The complementary sidelink synchronization signal is to be used by the second communications device to synchronize with the first communications device.

According to this application, the first communications device sends the complementary sidelink synchronization signal in a time interval for sending the first synchronization signal burst set and the second synchronization signal burst set. The complementary sidelink synchronization signal can meet a requirement of frequent synchronization information updates, occupies a few resources, and enables the second communications device to frequently perform synchronization with the first communications device, thereby improving synchronization reliability in V2X communication.

In one embodiment, a physical broadcast channel included in the L synchronization signal blocks includes first indication information, or the receiving unit is configured to receive first indication information from a network device, a physical broadcast channel included in the L synchronization signal blocks includes first indication information, and the first indication information indicates a time unit in which the first communications device sends or skips sending a complementary sidelink synchronization signal in the m time units. In this way, a transmission interval of complementary sidelink synchronization signals may be indicated by the first indication information or indicated by the network device, so that transmission of complementary synchronization signals can be configured more flexibly.

In one embodiment, the receiving unit is configured to receive a complementary sidelink synchronization signal from the first communications device on a first resource in a third time unit. The first resource belongs to a second resource in the third time unit, or the first resource belongs to a third resource in the third time unit. The third time unit belongs to the n time units. The second resource in the third time unit may be used by the receiving unit to receive sidelink control information from the first communications device. The third resource in the third time unit may be used by the receiving unit to receive sidelink data from the first communications device. In this way, a resource occupied by the complementary sidelink synchronization signal may be a resource for sending the sidelink control information or a resource for sending the sidelink data, thereby improving resource utilization.

In one embodiment, the receiving unit is configured to receive a complementary sidelink synchronization signal from the first communications device on the $1^{st}$ symbol in a third time unit. The third time unit belongs to the n time units.

In one embodiment, the complementary sidelink synchronization signal is further used for automatic gain control. In this way, the complementary sidelink synchronization signal can be used for both synchronization and automatic gain control, thereby improving resource utilization.

In one embodiment, that the receiving unit is configured to receive a first synchronization signal burst set from a first communications device in at least one time unit in a first time unit set includes: The receiving unit is configured to receive, from the first communications device in at least one time unit in the first time unit set, the first synchronization signal burst set sent by the first communications device through beam sweeping. That the receiving unit is configured to receive a second synchronization signal burst set from the first communications device in at least one time unit in a second time unit set includes: The receiving unit is configured to receive, from the first communications device in at least one time unit in the second time unit set, the second synchronization signal burst set sent by the first communications device through beam sweeping. In this way, the first communications device may send the first synchronization signal burst set and the second synchronization signal burst set through beam sweeping.

In one embodiment, the second communications device further includes a sending unit. The sending unit is configured to send second indication information. The second indication information indicates a beam selected by the second communications device. In this way, the second communications device sends feedback beam selection information to the first communications device.

In one embodiment, that the receiving unit is configured to receive a complementary sidelink synchronization signal from the first communications device in n time units of the m time units includes: The receiving unit is configured to receive, from the first communications device in the n time units of the m time units, the complementary sidelink synchronization signal sent by the first communications device through beam sweeping, omnidirectional transmission, or transmission with a specific beam.

According to a fifth aspect, an embodiment of this application provides a computer-readable storage medium. The computer-readable storage medium stores instructions. When the instructions are run on a computer, the computer is enabled to perform the methods in the foregoing aspects.

According to a sixth aspect, an embodiment of this application provides a computer program product. The program product stores computer software instructions used by the first communications device or the second communications device. The computer software instructions include programs used to perform the solutions in the foregoing aspects.

According to a seventh aspect, an embodiment of this application provides a chip, configured to perform the methods in the foregoing aspects. The chip may include a part that has functions of a memory, a processor, a transmitter, a receiver, and/or a transceiver. The memory stores instructions, code, and/or data used to perform the methods in the foregoing aspects.

According to an eighth aspect, an embodiment of this application provides a system. The system includes the first communications device and the second communications device in the foregoing aspects.

DESCRIPTION OF EMBODIMENTS

Figure 1:
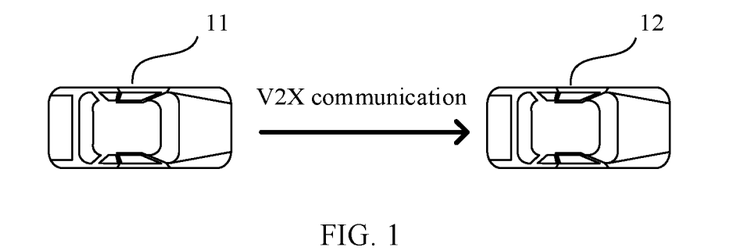
FIG. 1 is a block diagram according to an embodiment of this application.

FIG. 1 is a schematic architectural diagram of a possible V2X communications system according to an embodiment of this application. As shown in FIG. 1, the V2X communications system includes a first communications device 11 and a second communications device 12. V2X communication includes a sidelink synchronization signal (SLSS) sent by the first communications device 11 to the second communications device 12. The second communications device 12 performs detection on a primary synchronization signal to obtain timing information, and then performs detection on a secondary synchronization signal based on the timing information to obtain a sidelink synchronization identification of the first communications device 11, to synchronize with the first communications device 11. After the second communications device 12 is synchronized with the first communications device 11, the first communications device 11 may send sidelink control information and sidelink data to the second communications device 12. There may be one or more "second communications devices" in this application. If there are a plurality of second communications devices, the first communications device 11 sends sidelink synchronization signals to the plurality of second communications devices. For ease of description, one second communications device is used as an example for description in this application. However, a quantity of second communications devices included in this application includes but is not limited to this.

The first communications device and the second communications device in this application may include any device with a wireless communication function, or a unit, a component, an apparatus, a chip, or an SOC in the device. The device with the wireless communication function may be, for example, a vehicle-mounted device, a wearable device, a computing device, another device connected to a wireless modem, a mobile station (MS), a terminal, or user equipment (UE).

All or some of this application may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The following describes the embodiments of this application in more details by using a first communications device and a second communications device as examples with reference to specific examples.

Figure 2:
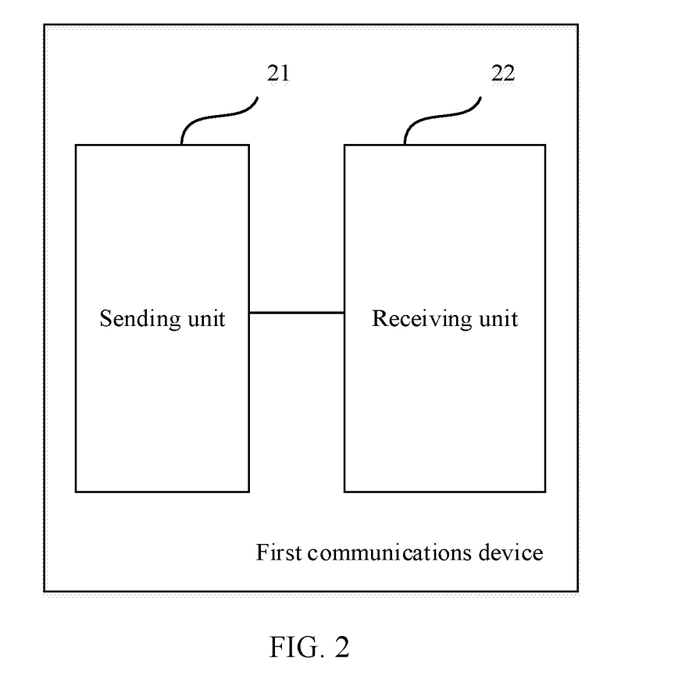
FIG. 2 shows a first communications device according to an embodiment of this application.
Figure 3:
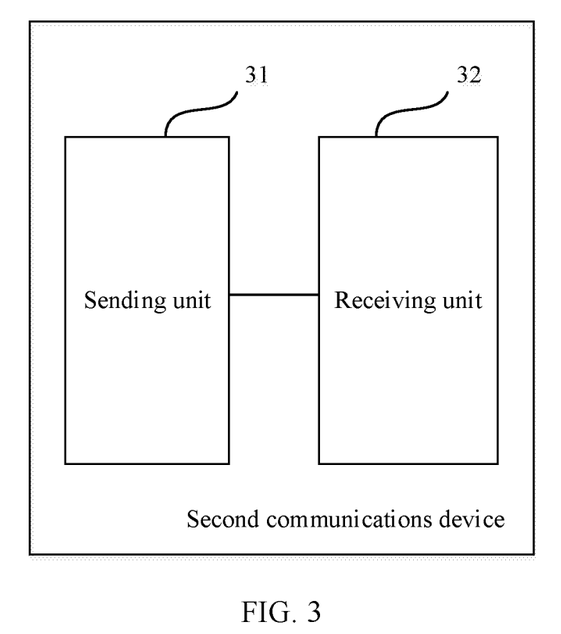
FIG. 3 shows a second communications device according to an embodiment of this application.
Figure 4:
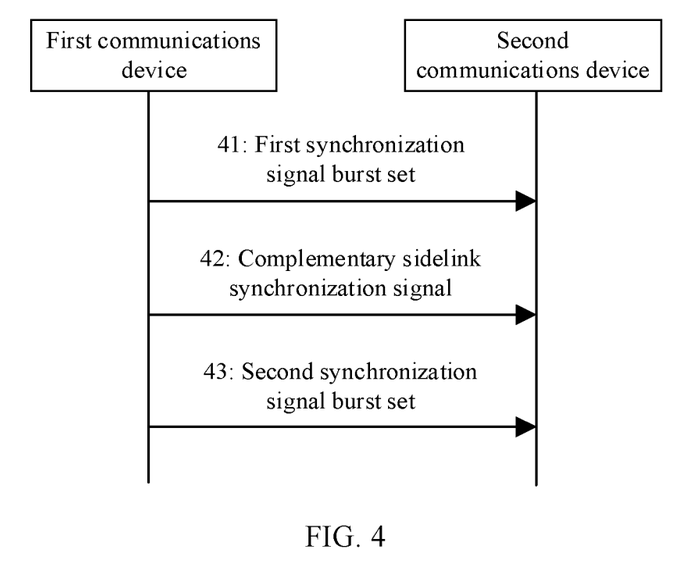
FIG. 4 shows a synchronization signal sending method, a first communications device, and a second communications device according to an embodiment of this application.

FIG. 4 shows a synchronization signal sending method, a first communications device, a second communications device, and a system according to an embodiment of this application. As shown in FIG. 2, the first communications device includes a sending unit 21 and a receiving unit 22, and may further include a processing unit 23. The sending unit 21 and the receiving unit 22 may be replaced with a transceiver unit. As shown in FIG. 3, the second communications device includes a sending unit 31 and a receiving unit 32, and may further include a processing unit 33. The sending unit 31 and the receiving unit 32 may be replaced with a transceiver unit.

When the first communications device and the second communications device are terminal devices or UEs, the processing unit 23 and the processing unit 33 may be processors, the sending unit 21 and the receiving unit 22 may be a transceiver, the sending unit 31 and the receiving unit 32 may be a transceiver, the sending unit 21 and the sending unit 31 may be transmitters, and the receiving unit 22 and the receiving unit 32 may be receivers. The transceivers, the transmitters, or the receivers may be radio frequency circuits. When the first communications device or the second communications device includes a storage unit, the storage unit is configured to store computer instructions. The processor is communicatively connected to the storage unit, and the processor executes the computer instructions stored in the storage unit, so that the first communications device or the second communications device performs the method in the embodiment of FIG. 4. The processor may be a general-purpose central processing unit (CPU), a microprocessor, or an application-specific integrated circuit (ASIC).

When the first communications device and the second communications device are chips, the processing unit 23 and the processing unit 33 may be processors, the sending unit 21 and the sending unit 31 may be output interfaces, pins, circuits, or the like, the receiving unit 22 and the receiving unit 32 may be input interfaces, pins, circuits, or the like, and the transceiver unit may be, for example, an input/output interface, a pin, or a circuit. The processing unit may execute computer-executable instructions stored in a storage unit, so that the first communications device and the second communications device perform the method in FIG. 4. In one embodiment, the storage unit is a storage unit in the chip, for example, a register or a cache. Alternatively, the storage unit may be a storage unit that is in a terminal and that is located outside the chip, for example, a read-only memory (ROM)

or another type of static storage device that can store static information and instructions, or a random access memory (RAM).

Specific operations in the embodiment of FIG. 4 are as follows:

Operation 41: The sending unit 21 of the first communications device sends a first synchronization signal burst set to the second communications device in at least one time unit in a first time unit set, and the receiving unit 32 of the second communications device receives the first synchronization signal burst set from the first communications device in at least one time unit in the first time unit set. The first synchronization signal burst set includes L synchronization signal blocks. The first time unit set includes p time units, and p is a positive integer. The sending unit 21 of the first communications device may send the first synchronization signal burst set to the second communications device in at least one time unit in the first time unit set through beam sweeping. The receiving unit 32 of the second communications device receives, from the first communications device in at least one time unit in the first time unit set, the first synchronization signal burst set sent by the first communications device through beam sweeping. The first communications device may send the first synchronization signal burst set by using a plurality of antenna elements through beam sweeping. For example, a phase and an amplitude of each unit of an array antenna may be controlled to sequentially send n sector beams or signals in different directions in three-dimensional space. The n sector beams or signals are not superposed, and each sector beam or signal occupies 360°/n sectors.

After operation 41, the sending unit 31 of the second communications device sends second indication information to the first communications device, and the receiving unit 22 of the first communications device receives the second indication information from the second communications device. The second indication information indicates a beam selected by the second communications device. After receiving the first synchronization signal burst set sent by the first communications device through beam sweeping, the second communications device performs detection on a received beam with highest signal strength, and feeds back, in the second indication information, beam information of the selected beam with the highest signal strength to the first communications device. The selected beam may be used by the first communications device to send a complementary sidelink synchronization signal to the second communications device through transmission with a specific beam.

Operation 43: The sending unit 21 of the first communications device sends a second synchronization signal burst set to the second communications device in at least one time unit in a second time unit set, and the receiving unit 32 of the second communications device receives the second synchronization signal burst set from the first communications device in at least one time unit in the second time unit set. The second synchronization signal burst set includes I synchronization signal blocks. The second time unit set includes q time units, and q is a positive integer. The synchronization signal block includes at least one of the following information: a primary synchronization signal, a secondary synchronization signal, or a physical broadcast channel. An interval between the last time unit in the first time unit set and the $1^{st}$ t time unit in the second time unit set is m time units. L and I are integers greater than or equal to 1. m is an integer greater than or equal to 1. The sending unit 21 of the first communications device may send the second synchronization signal burst set to the second communications device in at least one time unit in the second time unit set through beam sweeping. The receiving unit 32 of the second communications device receives, from the first communications device in at least one time unit in the second time unit set, the second synchronization signal burst set sent by the first communications device through beam sweeping.

Figure 5:
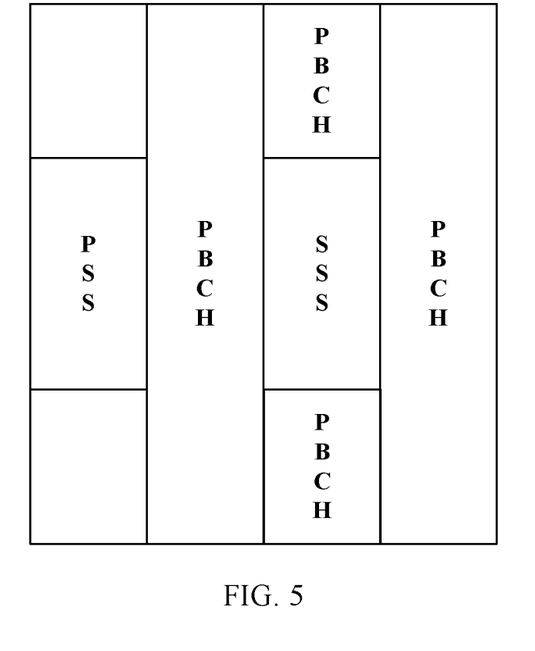
FIG. 5 is a block diagram of a synchronization signal block according to an embodiment of this application.

Sizes of the first time unit set and the second time unit set may be the same. The first time unit set and the second time unit set each may be an X-millisecond time window in time domain, where X is a decimal or an integer greater than 0, for example, a 5-ms time window. The first synchronization signal burst set and the second synchronization signal burst set each are sent in a 5-ms time window. A 5-ms time window is used as an example for description below. A maximum quantity M of synchronization signal blocks included in each of the first synchronization signal burst set and the second synchronization signal burst set is related to a carrier frequency. A structure of the synchronization signal block may be shown in FIG. 5, and the synchronization signal block may occupy four symbols in time domain. When the carrier frequency does not exceed 3 GHz, M=4; when the carrier frequency is between 3 GHz and 6 GHz (including 6 GHz), M=8; or when the frequency is between 6 GHz and 52.6 GHz (including 52.6 GHz), M=64.

Figure 6:
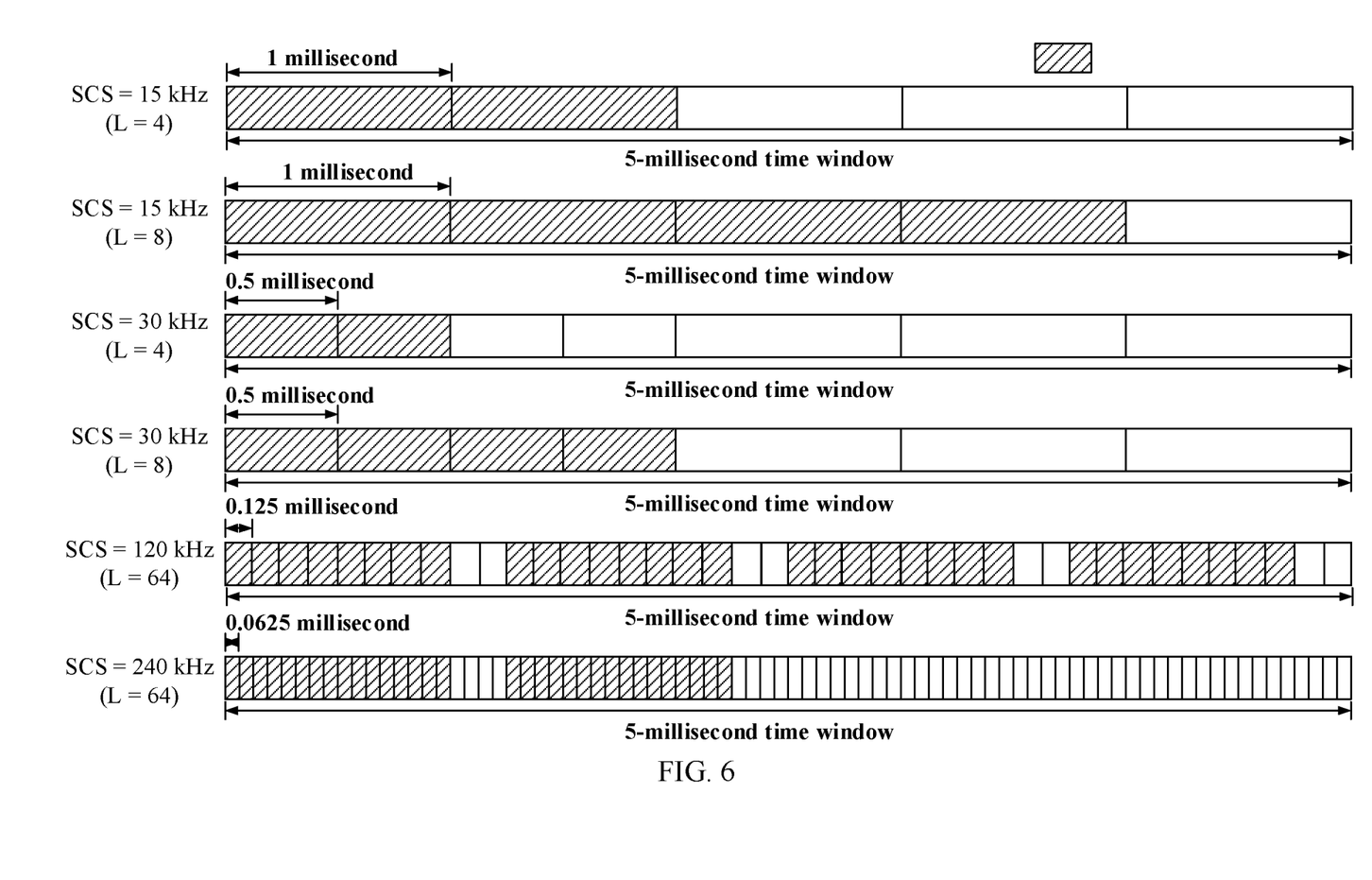
FIG. 6 is a block diagram of sending a synchronization signal burst set according to an embodiment of this application.

The quantity L of synchronization signal blocks included in the first synchronization signal burst set and the quantity I of synchronization signal blocks included in the second synchronization signal burst set may be less than or equal to the maximum quantity M. The first time unit and the second time unit may be slots, mini-slots, subframes, or symbols. Slots are used as an example for description below. By using the first synchronization signal burst set as an example, FIG. 6 shows locations of synchronization signal blocks in the first synchronization signal burst set or the second synchronization signal burst set in 5-ms time windows with different subcarrier spacings (SCS). Transmission of the L synchronization signal blocks included in the first synchronization signal burst set needs to be completed in a 5-ms time window, and synchronization signal blocks may be sent periodically. One slot may include two synchronization signal blocks. When subcarrier spacings are different, slot duration varies, and a time for completing transmission of a synchronization signal burst set also varies. For example, assuming that SCSs are 15 kHz and 30 kHz, when L=4, two slots are occupied, and durations are 2 ms and 1 ms respectively. A method for sending the second synchronization signal burst set is the same as that for sending the first synchronization signal burst set, and is specifically implemented based on an actual value of the quantity I of included synchronization signal blocks.

Operation 42: The sending unit 21 of the first communications device sends a complementary sidelink synchronization signal (CSSS) to the second communications device in n time units of the m time units, and the receiving unit 32 of the second communications device receives the complementary sidelink synchronization signal from the second communications device in n time units of the m time units. n is a positive integer less than or equal to m. The CSSS is to be used by the second communications device to synchronize with the first communications device. The CSSS includes timing information, and the second communications device can also perform synchronization with the first communications device in the m time units. The m time units may be m slots, mini-slots, subframes, or symbols. m slots are used as an example for description below. The first communications device may send the complementary sidelink synchronization signal to the second communications device in the n time units of the m time units through beam sweeping, more specifically, send the complementary sidelink synchronization signal in a manner of sending beams or signals in different directions at different times by using an antenna array. Alternatively, the first communications device may send the complementary sidelink synchronization signal to the second communications device in the n time units of the m time units through omnidirectional transmission, or may send the complementary sidelink synchronization signal in all directions of three-dimensional space by using one antenna or an antenna array. Alternatively, the first communications device may send the complementary sidelink synchronization signal to the second communications device in the n time units of the m time units through transmission with a specific beam, more specifically, send the complementary sidelink synchronization signal in a specific direction by using one antenna or an antenna array.

The complementary sidelink synchronization signal may be generated by using a sidelink synchronization identification (SS-ID) of the first communications device, and the CSSS may be a ZC sequence, a PN sequence, an M sequence, or a Gold sequence generated based on the SS-ID. The SS-ID may be a root of the ZC sequence, an initial value of a PN sequence generation shift register, or the like. When the M sequence is used to generate the complementary sidelink synchronization signal, the SS-ID may be directly used as an initial value of a shift register. More specifically, the initial value C_init is a binary expression of the SS-ID, that is, C_init=BIN(SS-ID). Alternatively, the SS-ID is divided into two parts: an NID1 and an NID2, for example, SS-ID=3×NID1+NID2. Assuming that C_init=BIN(NID2), a sequence $x_0(n)$ is generated by using the shift register, and a cyclic shift is performed on $x_0(n)$ to obtain $x_0(n+i_1)$, where a value $i_1$ of the cyclic shift is calculated by using the NID1.

A physical broadcast channel included in the L synchronization signal blocks includes first indication information, or the second communications device receives first indication information from a network device. A physical broadcast channel included in the L synchronization signal blocks includes first indication information. The first indication information indicates a time unit in which the first communications device sends or skips sending a complementary sidelink synchronization signal in the m time units. The first indication information may be a bitmap (Pattern), and information carried in the bitmap may indicate to send or skip sending a complementary sidelink synchronization signal in a corresponding time unit. Alternatively, the first indication information may be indication information in another form. The first indication information may be used to configure whether to send or skip sending a CSSS in a specific time unit. In other words, whether to send a CSSS in each specific time unit is optional, and CSSSs may be sent in some time units, and may not be sent in some time units. This may be indicated by the first indication information. A CSSS transmission information may be alternatively predefined by a network. It may be predefined that CSSSs are to be sent in all the m time units, or predefined that CSSSs are to be sent in some of the m time units and no CSSSs are to be sent in some of the m time units.

Figure 7:
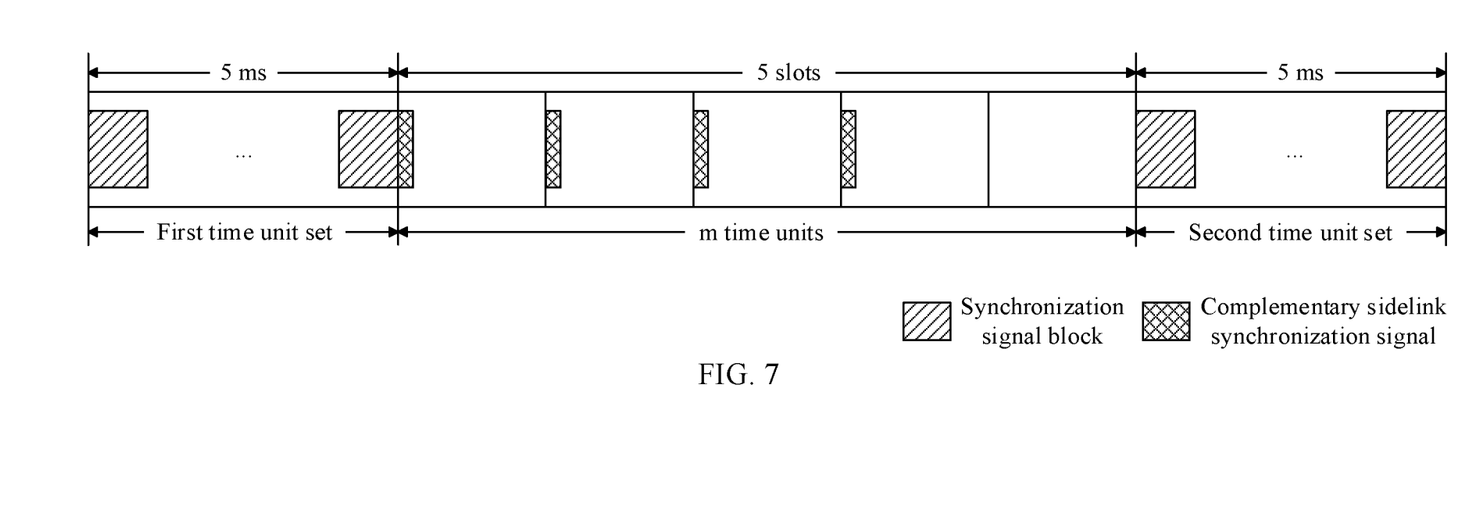
FIG. 7 is a block diagram of sending a complementary sidelink synchronization signal according to an embodiment of this application.

For example, as shown in FIG. 7, the interval between the last time unit in the first time unit set and the $1^{st}$ time unit in the second time unit set is five slots, that is, m=5. The bitmap information may include five bits, for example, 1 1 1 1 0, and is used to specifically indicate whether to send or skip sending a complementary sidelink synchronization signal in each of the five slots. In FIG. 7, the first communications device sends a CSSS to the second communications device in the first four slots, and sends no CSSS in the $5^{th}$ slot. The CSSS is used to assist the synchronization signal block in synchronization, to improve synchronization reliability in an internet of vehicles.

Figure 8:
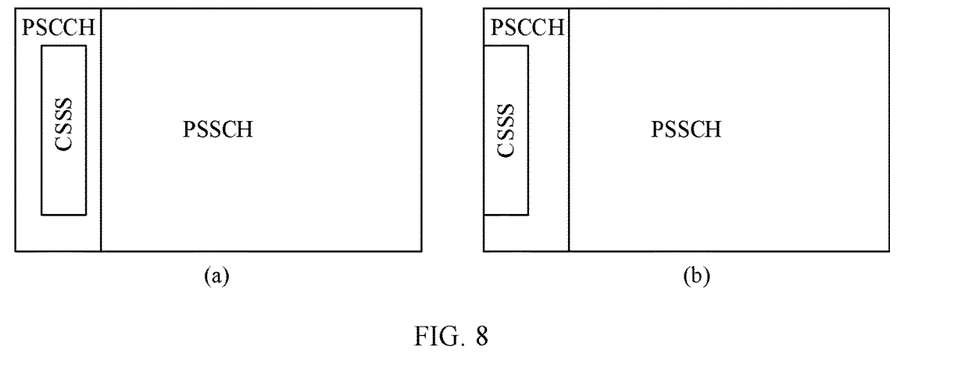
FIG. 8 shows a resource configuration method for a complementary sidelink synchronization signal according to an embodiment of this application.
Figure 9:
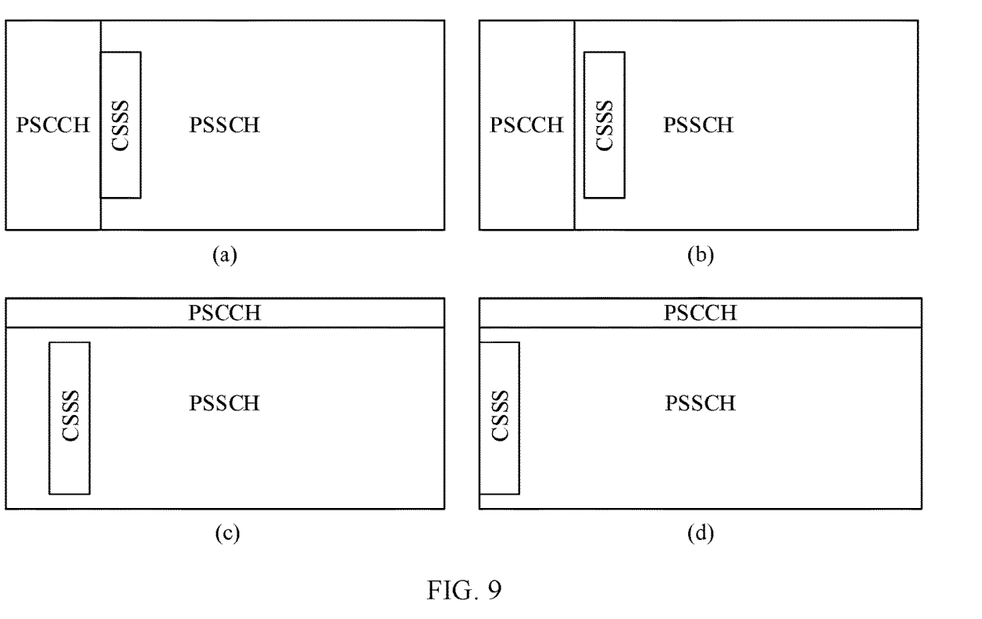
FIG. 9 shows a resource configuration method for a complementary sidelink synchronization signal according to an embodiment of this application.

The sending unit 21 of the first communications device sends a complementary sidelink synchronization signal to the second communications device on a first resource in a third time unit, and the receiving unit 32 of the second communications device receives the complementary sidelink synchronization signal from the first communications device on the first resource in the third time unit. The first resource belongs to a second resource in the third time unit, or the first resource belongs to a third resource in the third time unit. The third time unit belongs to the n time units. The second resource in the third time unit may be used by the first communications device to send sidelink control information to the second communications device. The third resource in the third time unit may be used by the first communications device to send sidelink data to the second communications device. Resource configuration information of the CSSS may be predefined by a network, indicated by the first communications device, or indicated by a network device. The CSSS may occupy one symbol in time domain, and the CSSS may be sent on a resource of a sidelink control channel (PSCCH). As shown in FIG. 8, a frequency domain resource of the PSCCH includes a frequency domain resource of the CSSS, and a time domain resource of the PSCCH includes a time domain resource of the CSSS. Alternatively, the CSSS may be sent on a resource of a PSSCH. As shown in FIG. 9, a frequency domain resource of the PSSCH includes a frequency domain resource of the CSSS, and a time domain resource of the PSSCH includes a time domain resource of the CSSS. Frequency division multiplexing, time division multiplexing, or other resource multiplexing forms may be used for the sidelink control channel and the sidelink shared channel (PSSCH). FIG. 8 and FIG. 9 show only one of the resource multiplexing modes. The CSSS may be set to be in the front in time domain, and in the middle of current bandwidth in frequency domain. In practice, there may be further other forms of resource configuration modes.

Figure 10:
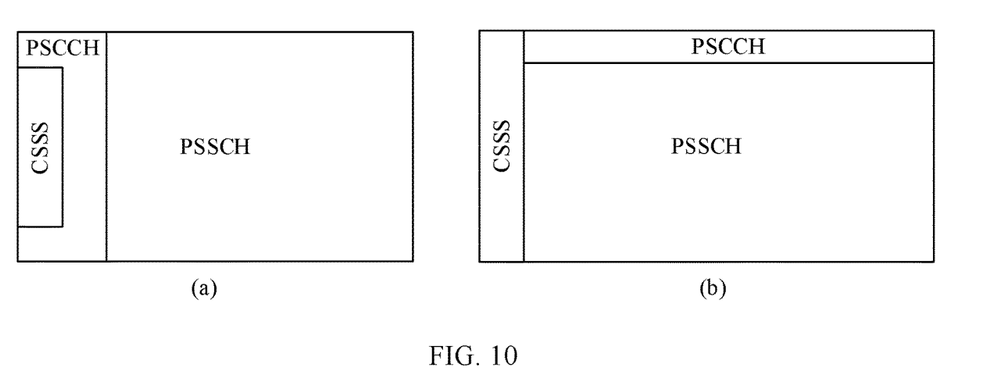
FIG. 10 shows a resource configuration method for a complementary sidelink synchronization signal according to an embodiment of this application.

The first communications device sends a complementary sidelink synchronization signal to the second communications device on the $1^{st}$ symbol in a third time unit. The third time unit belongs to the n time units. The complementary sidelink synchronization signal is further used for automatic gain control (AGC). The CSSS occupies a symbol used for the AGC, and a length of a CSSS sequence is less than or equal to a quantity of resource units occupied by the AGC. The CSSS sequence is sent as a part of an AGC resource, and may be sent according to an indication of the first indication information, or may be sent in each slot without configuration. When time division multiplexing is used for a PSSCH and a PSCCH, the CSSS is sent on the PSCCH, a frequency domain resource of the PSCCH includes a frequency domain resource of the CSSS, and a time domain resource of the PSCCH includes a time domain resource of the CSSS, as shown in (a) in FIG. 10. When frequency division multiplexing is used for a PSSCH and a PSCCH, the CSSS is sent on both the PSSCH and the PSCCH, as shown in (b) in FIG. 10.

What is claimed is:
1. A synchronization signal sending method, comprising:
sending, by a first communications device, a first synchronization signal burst set to a second communications device in at least one time unit in a first time unit set, wherein the first synchronization signal burst set comprises L synchronization signal blocks, wherein the first time unit set comprises p time units, and wherein p is a positive integer;

sending, by the first communications device, a second synchronization signal burst set to the second communications device in at least one time unit in a second time unit set, wherein the second synchronization signal burst set comprises I synchronization signal blocks, wherein the second time unit set comprises q time units, wherein q is a positive integer, wherein each synchronization signal block of the L synchronization signal blocks or the I synchronization signal blocks comprises at least one of a primary synchronization signal, a secondary synchronization signal, or a physical broadcast channel, wherein an interval between a last time unit in the first time unit set and a 1 time unit in the second time unit set is m time units, wherein L and I are integers greater than or equal to 1, and wherein m is an integer greater than or equal to 1, wherein the L synchronization signal blocks comprise a physical broadcast channel comprising first indication information, and wherein the first indication information indicates a time unit in which the first communications device sends or skips sending a complementary sidelink synchronization signal in the m time units; and sending, by the first communications device, a complementary sidelink synchronization signal to the second communications device in n time units of the m time units between the last time unit in the first time unit set of the first synchronization signal burst set and the first time unit in the second time unit set of the second synchronization signal burst set through a beam sweeping, wherein n is a positive integer less than or equal to m, and wherein the complementary sidelink synchronization signal is to be used by the second communications device to synchronize with the first communications device.

2. The method according to claim 1, further comprising:
sending, by the first communications device, the complementary sidelink synchronization signal to the second communications device on a first resource in a third time unit, wherein the first resource belongs to a second resource in the third time unit or the first resource belongs to a third resource in the third time unit, wherein the third time unit belongs to the n time units, wherein the second resource in the third time unit is configured for the first communications device to send sidelink control information to the second communications device, and wherein the third resource in the third time unit is configured for the first communications device to send sidelink data to the second communications device.

3. The method according to claim 1, further comprising:
sending, by the first communications device, the complementary sidelink synchronization signal to the second communications device on a $1^{st}$ symbol in a third time unit, wherein the third time unit belongs to the n time units.

4. The method according to claim 1, wherein:
the sending, by the first communications device, the complementary sidelink synchronization signal to the second communications device in the n time units of the m time units further comprises:
sending, by the first communications device, the complementary sidelink synchronization signal to the second communications device in the n time units of the m time units through an omnidirectional transmission, or a transmission with a specific beam.

5. A synchronization signal receiving method, comprising:
receiving, by a second communications device, a first synchronization signal burst set from a first communications device in at least one time unit in a first time unit set, wherein the first synchronization signal burst set comprises L synchronization signal blocks, wherein the first time unit set comprises p time units, and wherein p is a positive integer;

receiving, by the second communications device, a second synchronization signal burst set from the first communications device in at least one time unit in a second time unit set, wherein the second synchronization signal burst set comprises I synchronization signal blocks, wherein the second time unit set comprises q time units, wherein q is a positive integer, wherein each synchronization signal block of the L synchronization signal blocks or I synchronization signal blocks comprises at least one of a primary synchronization signal, a secondary synchronization signal, or a physical broadcast channel, wherein an interval between a last time unit in the first time unit set and a 1* time unit in the second time unit set is m time units, wherein L and I are integers greater than or equal to 1, and wherein m is an integer greater than or equal to 1, wherein the L synchronization signal blocks comprise a physical broadcast channel comprising first indication information, and wherein the first indication information indicates a time unit in which the first communications device sends or skips sending a complementary sidelink synchronization signal in the m time units; and receiving, by the second communications device, a complementary sidelink synchronization signal from the first communications device in n time units of the m time units between the last time unit in the first time unit set of the first synchronization signal burst set and the first time unit in the second time unit set of the second synchronization signal burst set through a beam sweeping, wherein n is a positive integer less than or equal to m, and wherein the complementary sidelink synchronization signal is to be used by the second communications device to synchronize with the first communications device.

6. The method according to claim 5, further comprising:
receiving, by the second communications device, the complementary sidelink synchronization signal from the first communications device on a first resource in a third time unit, wherein the first resource belongs to a second resource in the third time unit or the first resource belongs to a third resource in the third time unit, wherein the third time unit belongs to the n time units, wherein the second resource in the third time unit is configured for the second communications device to receive sidelink control information from the first communications device, and wherein the third resource in the third time unit is configured for the second communications device to receive sidelink data from the first communications device.

7. The method according to claim 5, further comprising:
receiving, by the second communications device, the complementary sidelink synchronization signal from the first communications device on a $1^{st}$ symbol in a third time unit, wherein the third time unit belongs to the n time units.

8. The method according to claim 5, wherein:
the receiving, by the second communications device, the complementary sidelink synchronization signal from the first communications device in the n time units of the m time units further comprises:
receiving, by the second communications device from the first communications device in the n time units of the m time units, the complementary sidelink synchronization signal sent by the first communications device through an omnidirectional transmission, or a transmission with a specific beam.

9. A first communications device, comprising:
a transmitter, configured to send a first synchronization signal burst set to a second communications device in at least one time unit in a first time unit set, wherein the first synchronization signal burst set comprises L synchronization signal blocks, wherein the first time unit set comprises p time units, and wherein p is a positive integer;
the transmitter is further configured to send a second synchronization signal burst set to the second communications device in at least one time unit in a second time unit set, wherein the second synchronization signal burst set comprises I synchronization signal blocks, wherein the second time unit set comprises q time units, wherein q is a positive integer, wherein each synchronization signal block of the L synchronization signal blocks or the I synchronization signal blocks comprises at least one of a primary synchronization signal, a secondary synchronization signal, or a physical broadcast channel, wherein an interval between a last time unit in the first time unit set and a 1* time unit in the second time unit set is m time units, wherein L and I are integers greater than or equal to 1, and wherein m is an integer greater than or equal to 1, wherein the L synchronization signal blocks comprise a physical broadcast channel comprising first indication information, and wherein the first indication information indicates a time unit in which the first communications device sends or skips sending a complementary sidelink synchronization signal in the m time units; and
the transmitter is further configured to send a complementary sidelink synchronization signal to the second communications device in n time units of the m time units between the last time unit in the first time unit set of the first synchronization signal burst set and the first time unit in the second time unit set of the second synchronization signal burst set through a beam sweeping, wherein n is a positive integer less than or equal to m, and wherein the complementary sidelink synchronization signal is to be used by the second communications device to synchronize with the first communications device.

10. The device according to claim 9, further comprising:
the transmitter is configured to send the complementary sidelink synchronization signal to the second communications device on a first resource in a third time unit, wherein the first resource belongs to a second resource in the third time unit or the first resource belongs to a third resource in the third time unit, wherein the third time unit belongs to the n time units, wherein the second resource in the third time unit is configured for the transmitter to send sidelink control information to the second communications device, and wherein the third resource in the third time unit is configured for the transmitter to send sidelink data to the second communications device.

11. The device according to claim 9, further comprising:
the transmitter is configured to send the complementary sidelink synchronization signal to the second communications device on a $1^{st}$ symbol in a third time unit, wherein the third time unit belongs to the n time units.

12. The device according to claim 9, wherein the transmitter is configured to send the complementary sidelink synchronization signal to the second communications device in the n time units of the m time units comprises:
the transmitter is configured to send the complementary sidelink synchronization signal to the second communications device in the n time units of the m time units through an omnidirectional transmission, or a transmission with a specific beam.

13. A second communications device, comprising:
a receiver, configured to receive a first synchronization signal burst set from a first communications device in at least one time unit in a first time unit set, wherein the first synchronization signal burst set comprises L synchronization signal blocks, wherein the first time unit set comprises p time units, and wherein p is a positive integer;
the receiver is further configured to receive a second synchronization signal burst set from the first communications device in at least one time unit in a second time unit set, wherein the second synchronization signal burst set comprises I synchronization signal blocks, wherein the second time unit set comprises q time units, wherein q is a positive integer, wherein each synchronization signal block of the L synchronization signal blocks or the I synchronization signal blocks comprises at least one of a primary synchronization signal, a secondary synchronization signal, or a physical broadcast channel, wherein an interval between a last time unit in the first time unit set and a 1* time unit in the second time unit set is m time units, wherein L and I are integers greater than or equal to 1, and wherein m is an integer greater than or equal to 1, wherein the L synchronization signal blocks comprise a physical broadcast channel comprising first indication information, and wherein the first indication information indicates a time unit in which the first communications device sends or skips sending a complementary sidelink synchronization signal in the m time units; and
the receiver is further configured to receive a complementary sidelink synchronization signal from the first communications device in n time units of the m time units between the last time unit in the first time unit set of the first synchronization signal burst set and the first time unit in the second time unit set of the second synchronization signal burst set through a beam sweeping, wherein n is a positive integer less than or equal to m, and wherein the complementary sidelink synchronization signal is to be used by the second communications device to synchronize with the first communications device.

14. The device according to claim 13, further comprising:
the receiver is configured to receive the complementary sidelink synchronization signal from the first communications device on a first resource in a third time unit, wherein the first resource belongs to a second resource in the third time unit or the first resource belongs to a third resource in the third time unit, wherein the third time unit belongs to the n time units, wherein the second resource in the third time unit is configured for the receiver to receive sidelink control information from the first communications device, and wherein the third resource in the third time unit is configured for the receiver to receive sidelink data from the first communications device.

15. The device according to claim 13, further comprising:
the receiver is configured to receive the complementary sidelink synchronization signal from the first communications device on a $1^{st}$ symbol in a third time unit, wherein the third time unit belongs to the n time units.

16. The device according to claim 13, wherein the receiver is configured to receive the complementary sidelink synchronization signal from the first communications device in the n time units of the m time units further comprises:
the receiver is configured to receive, from the first communications device in the n time units of the m time units, the complementary sidelink synchronization signal sent by the first communications device through an omnidirectional transmission, or a transmission with a specific beam.

* * * * *